United States Patent Office 3,168,600
Patented Feb. 2, 1965

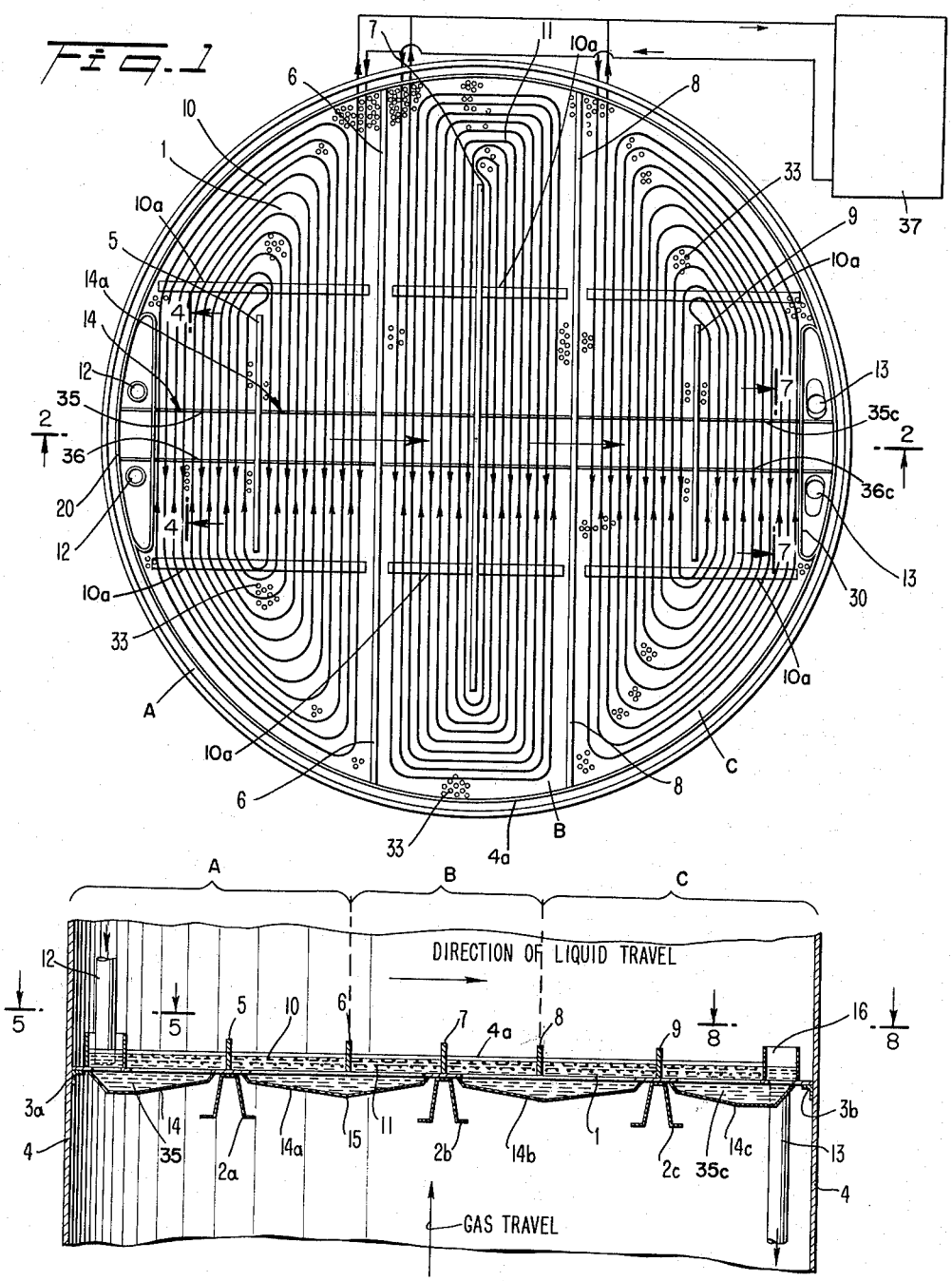

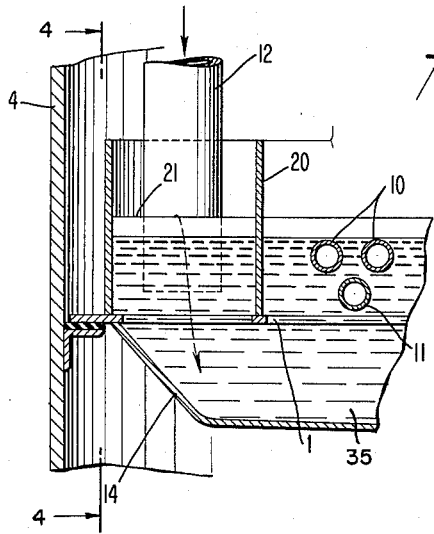
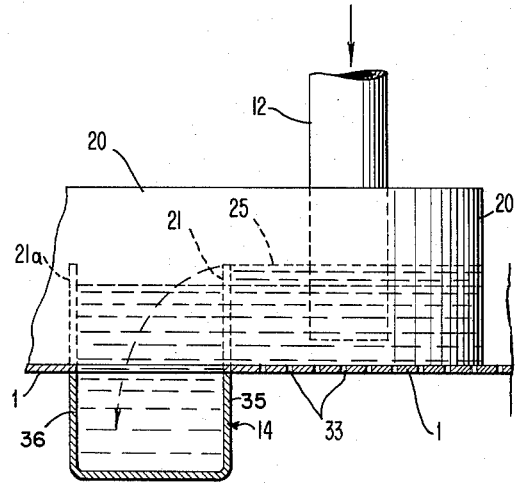
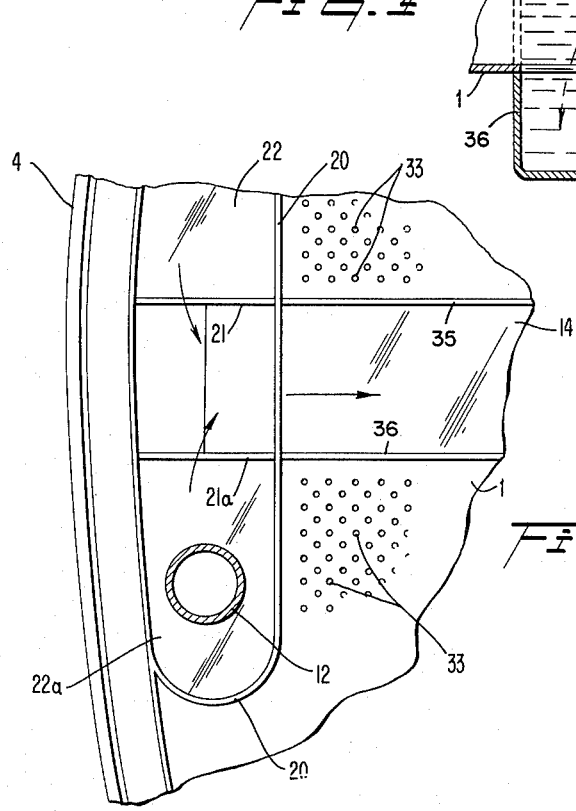

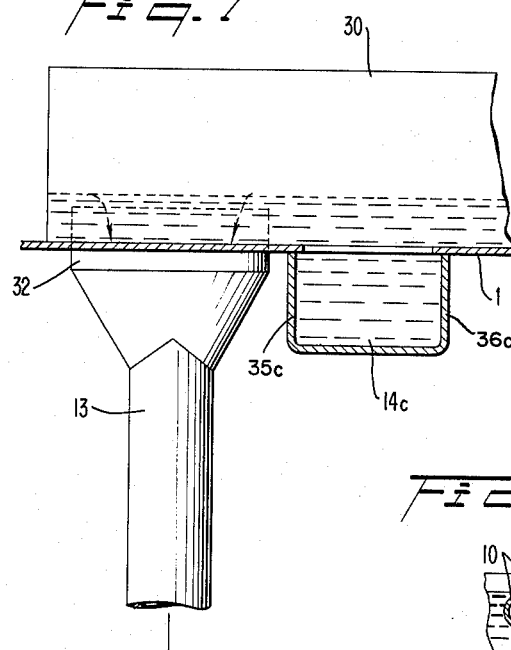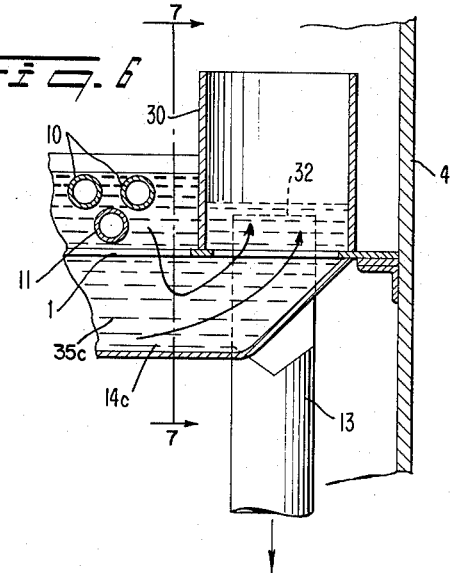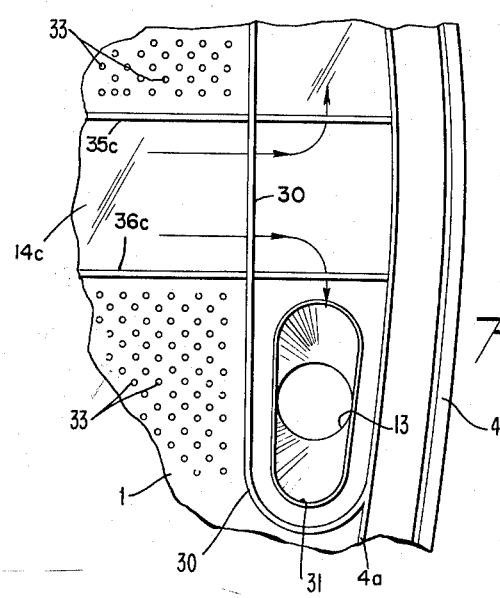

3,168,600
PLATE COLUMN
Georges Martin, Sannois, France, assignor to Compagnie de Saint-Gobain, Neuilly-sur-Seine, France
Filed Jan. 18, 1961, Ser. No. 83,485
Claims priority, application France Feb. 3, 1960
9 Claims. (Cl. 261—140)

This invention relates to plate columns for effecting contact between gases and liquids. The column of the invention may be employed for simply the physical absorption of gas by the liquid, or may be employed with a process wherein the gas is absorbed in the liquid by reason of a chemical reaction therewith.

The invention is particularly concerned with plate columns wherein the plates are provided with heat exchange coils in order to maintain the liquid on the plates at a temperature most favorable for a physical absorption or a chemical reaction. In accordance with the invention, the heat exchange coils may either heat or cool the liquid.

The plate column of the invention may be employed, for example, in the manufacture of nitric acid. In one method of making nitric acid there is employed one or more plate columns in which oxides of nitrogen are absorbed and oxidized by being passed through the column in the direction from the bottom to the top thereof in counter-current with a liquid which passes downwardly through the column from one plate to another. The described absorption is exothermic; it is very important that the heat thus developed be progressively eliminated, because the absorption of $NO_2$ in an aqueous liquid in the reoxidation of NO to $NO_2$ are carried out more efficiently the lower the temperature.

Prior plate columns for carrying out the above process among others have been provided with cooling coils so located as to lie within the layer of liquid on the plates. Such cooling means have been most widely used on the first plates of the column, that is, the plates at the lower end thereof. In order to improve the cooling efficiency of such coils, the coils have been disposed transversely with respect to the general direction in which the absorption liquid travels over the plate from the location of its admission to the plate to the location of its discharge from the plate onto the next lower plate. In order to improve the efficiency of heat exchange in such construction, baffles have been placed upon the upper surfaces of the plates, the baffles being so directed as to lie transversely to the general direction of travel of liquid on the plates. The described coils have been coiled around such baffles.

No matter what the particular operation carried out in the column may be, successive runs of the cooling coils must be placed close to each other if a good efficiency of heat exchange is to be obtained. Because of such close spacing of the tubes or pipes of the coils, there is left little space for the circulation of liquid over the plates. Thus there is a large loss from the theoretical capacity of the column, the cooling coils in effect constituting barriers to the flow of liquid therethrough; this causes a large variation in the thickness of the layer of liquid on the plates between the upper plates to which the liquid is first fed and the lowest plate from which the liquid is discharged from the column. The presence of the coils above the plates also causes heterogeneous disturbances in the rate of travel of the gas through the plates provided with the coils, thereby causing an additional loss in efficiency of the column. Further, the liquid has a tendency to force its way around the groups of tubes or pipes forming the coils, so that the rate of flow of the liquid between the tubes in the main part of the coils is small.

The present invention has as an object thereof the provision of an improved plate column for effecting contact between a gas and a liquid.

A further object of the invention lies in the provision of a plate column of the type indicated wherein at least some of the plates of the column are provided with heat exchange coils.

Generally, the improvement in accordance with the invention consists in the provision of means for guiding the absorption liquid on the plates in such manner as to distribute it substantially uniformly over each heat exchange coil and around one or more baffles on the plates disposed generally transversely to the general direction of flow of the liquid across the plates. One or more heat exchange coils is wound around the baffle, preferably being disposed so as substantially to cover the portion of the plate directly affected by such baffle. Liquid is brought onto the plate in such manner that it contacts the portion of the coil upstream of the baffle in a substantially uniform manner, and so that after passing around the baffle the liquid is combined downstream of the baffle in such manner that it contacts substantially uniformly all the surface of the coil disposed downstream of the baffle.

In accordance with one preferred embodiment of the apparatus of the invention, the plates are provided with a plurality of laterally spaced baffles and with a channel located upstream of the first baffle and perpendicularly to the axis of such baffle. Liquid introduced to the plate falls into the channel from which it spreads out laterally to flow along the surface of the coil located upstream of the baffle. After having passed out of contact with such upstream portion of the coil, the liquid passes inwardly along the downstream portion of the coil into a second channel which is disposed as a prolongation of the first channel. From the second channel the liquid starts a second flow cycle, this time passing along the portion of a second coil disposed upstream of a second baffle, then around the ends of the second baffle, and back to still a further channel along the portion of the second coil downstream of the second baffle.

The described construction insures that the absorption liquid will circulate past the entire cooling surfaces of the tubes which make up the cooling coils. After having passed from one side of the plate to the other, by passing around successive baffles as above described, the liquid is discharged from a plate so as to fall upon the next lower plate.

In the drawings, forming a portion of the specification, there is shown a non-limiting preferred embodiment of a plate column in accordance with the invention. The column is of the type useful in producing nitric acid, and has a plurality of multi-perforated plates located one above the other in spaced relationship in the column. Each plate carries five transverse baffles and three sets of cooling coils, the coils being disposed respectively about the first, third, and fifth baffle. In such embodiment each group or set of cooling coils is formed by two superimposed layers of pipes or tubes.

In the drawings:

FIG. 1 is a view in horizontal section through a column, the figure showing in plan a plate provided with baffles, heat exchange coils, and channels in accordance with the invention;

FIG. 2 is a view in vertical cross section through the column and plate of FIG. 1, the section being taken along the line 2—2 of FIG. 1;

FIG. 3 is an enlarged view of the left hand portion of FIG. 2 taken on line 2—2 of FIG. 1;

FIG. 4 is a fragmentary view in elevation of the portion of the apparatus shown in FIG. 3, the view being taken in a direction from right to left in FIG. 3;

FIG. 5 is a fragmentary view in horizontal section through the left-hand portion of the apparatus shown in FIG. 2, the section being taken along the line 5—5 of FIG. 2;

FIG. 6 is an enlargement of the right-hand portion of FIG. 2;

FIG. 7 is a view in vertical section of the apparatus shown in FIG. 6, the section being taken along line 7—7 of FIG. 6; and FIG. 8 is a fragmentary view in horizontal section through the portion of the apparatus shown at the right in FIG. 2, the section being taken along the line 8—8 of FIG. 2.

In the drawings there is shown a portion of a vertical column having a cylindrical side wall 4. Mounted in the column transversely thereof on brackets 3a, 3b, affixed to the wall there is shown a horizontal plate 1 which is made up of an assembly of connected plate members. The resulting plate 1 extends completely across a section of the column and has an upstanding rim 4a extending around said plate and spaced from and parallel to side wall 4. The main exent of the plate is provided with a plurality of small openings 33 therethrough through which the gas rising in the column may pass. The plate 1 is further secured to the column 4 by braces in the form of inverted channel members 2a, 2b, and 2c.

As particularly shown in FIGS. 1 and 2, the plate 1 is provided with five parallel baffles 5, 6, 7, 8, and 9. Each of the baffles 5, 7, and 9 is surrounded by its respective set of heat exchange coils formed by two superimposed layers of tubes 10 and 11 which are supported by conventional tube support means 10a. The two layers of tubes in each coil may be connected in series or parallel. The entering and exit ends of such tubes extend outwardly through the wall 4 of the column where they are connected to a suitable source and sump for heat exchange fluid. In the described preferred example of apparatus, for making nitric acid, the coils are cooling coils and are connected to suitable cooling means such as a refrigerator compressor shown schematically at 37 in FIG. 1.

Absorption liquid is fed to the plate 1 by two tubes 12 which lead from a similar plate disposed in the column above plate 1, such other plate (not shown) being displaced at an angle of 180° with respect to plate 1 about the vertical axis of the column. The lower ends of tubes 12 lead to a distributor 20, 21 which will be described in more detail in connection with FIGS. 3, 4, and 5. The discharge of liquid from plate 1 is effected by two tubes 13, the upper ends of tubes 13 being connected to a collector 16 which will be described in detail in connection with FIGS. 6, 7, and 8.

The plate 1 is divided into three zones A, B, and C by two spaced parallel partitions 6 and 8. Such three zones of the plate are respectively provided with cross baffles 5, 7, and 9 which are arranged symmetrically thereto and parallel to partitions 6 and 8. The opposite ends of baffles 5, 7, and 9 are spaced substantially from the inner sidewall of the enclosure 4 forming the column, such enclosure, in effect, forming a liquid-retaining rim about the plate 1. Each zone of the plate is provided with a separate set of coiled heat exchange tubes 10, 11, such tubes being coiled about the respective baffles 5, 7, and 9 in the manner shown in FIG. 1.

As will be seen in FIGS. 1 and 2, the liquid feeding means 12 are located at zone A and communicate with a channel or trough 14 which is disposed beneath the plate 1 between the feeding means 20, 21 and the baffle 5. The depth of channel 14 decreases in the direction from the feeding means to the baffle 5, becoming zero adjacent the baffle. As seen in FIG. 1, the trough 14 has a width which is a small part of the width (diameter) of plate 1. Downstream of the baffle 5 there is a further channel 14a, the depth of which increases progressively to a maximum at a location 15 beneath a partition 6. From location 15 the depth of channel 14a decreases progressively in the direction toward central baffle 7, the depth of the channel decreasing to zero adjacent such baffle. At the other side of baffle 7 there are further channels 14b and 14c, channel 14b being the same as channel 14a, and channel 14c being the same as channel 14, except that it is turned 180° with respect thereto. Channel 14c discharges into a collector 16 which is disposed diametrically across the plate from the means which feeds liquid to the plate.

It will be seen that the only path of communication between the successive zones A, B, and C of the plate is by way of the respective channels 14a, 14b which pass beneath the partitions 6 and 8. The locations of greatest depth of the channels lie beneath such partitions, so that the channels may accommodate all of the liquid flowing between zones A, B, and C of the plate. The channels are made of imperforate sheet metal, and are connected at their open tops to slots in the body of plate 1 so that the upper edges of the sidewalls of the troughs lie flush with the upper surface of plate 1 (FIGS. 2, 3, 4, 6, and 7). Except for the troughs, the horizontal plate 1 is provided with a plurality of small holes 33 therethrough through which the gas rising in the column may pass. The pressure of such gas prevents any appreciable leakage of the liquid on the plate downwardly through holes 33.

By reference to FIGS. 1 and 2, it will be seen that the liquid fed downwardly through pipes 12 falls into trough 14 in which it then rises to flow over the upper edges of the sidewalls 35 and 36 of such trough. As most clearly shown in FIG. 4, the upper edges of such sidewalls 35 and 36 lie flush with the upper surface of plate 1. After rising to the level of the upper surface of plate 1, the liquid in trough 14 spreads laterally upon plate 1 in the first zone thereof so as to flow in either direction along the straight portions of heat exchange tubes 10, 11 upstream of baffle 5. The liquid then turns about the ends of baffle 5 and flows in two oppositely directed streams toward the entering end of trough 14a. In so doing, the liquid generally follows the direction of the heat exchange tubes throughout the extent of the latter. As above set forth, the liquid passes from the first zone A to the second zone B of plate 1 flowing beneath partition 6 in trough 14a. Upon rising above the upper edges of the sidewalls of trough 14a the liquid enters the second end of zone B upstream of baffle 7. It will be obvious from the above that liquid flow conditions in both the second zone B and the third zone C of plate 1 are generally the same as those in the first zone, which have been described in detail. It will be apparent that the described flow of liquid across zones A, B, and C from the entering end of channel 14 to the exit end of channel 14c takes place by reason of the fact that the liquid level at zone A is at least slightly greater than that at zone B, and that the liquid level at zone B is at least slightly greater than that at zone C.

Turning now to FIGS. 3, 4, and 5, the details of the means for feeding absorption liquid onto the plate 1 will now be described. The means on the plate fed by tubes 12 is essentially in the form of a tank 20, tank 20 being generally oblong in shape and straddling the trough 14 symmetrically with respect to the center line X—X' thereof. One tube 12 is disposed with its lower end in one end of tank 20 at one side of trough 14 and the other tube 12 is symmetrically disposed at the other end of tank 20. Tank 20 is divided into three compartments by two parallel partitions 21, 21a which extend from the bottom of tank 20 generally intermediate the height of the tank. As shown, partitions 21, 21a are parallel and spaced apart a distance equal to the width of trough 14. There are thus formed two compartments 22 and 22a located at the ends of tank 20. The lower ends of the respective pipes 12 extend into compartments 22 and 22a to a depth appreciably below the upper edges of partitions 21 and 21a. The bottoms of compartments 22, 22a are imperforate so that the liquid fed thereinto by the pipes 12 must rise above the upper edges of partitions 21, 21a before it can flow downwardly into trough 14.

In FIGS. 6, 7, and 8 the means for discharging liquid from plate 1 is shown in detail. An oblong open-bottomed tank 30, generally similar to the above-described tank 20, straddles the trough 14c symmetrically with respect to the center line Y—Y' thereof. Liquid traveling in trough 14c passes upwardly over the upper edges 35c and 36c of trough 14c and rises into the central portion of tank 30 and vents into the upwardly flared ends 31, 32 of collector tubes 13. The upper edges of members 31 and 32 constitute seals or partitions over which the liquid in tank 30 must flow before the liquid flows downwardly in the tubes 13. The tubes 13 lead to the next lower plate in the column which may be of the same construction and be fed with liquid in the same manner as the plate 1.

The construction of the plate in accordance with the invention improves to a considerable extent the exchange of heat between the liquid on the plate and the heat exchange tubes 10, 11. At the same time, the construction in accordance with the invention offsets the loss of capacity of liquid caused by the presence of the heat exchange coils. The construction also permits the size of the column to be reduced while maintaining the same production; alternatively, all other things being equal, a column in accordance with the invention has an increased productive capacity over a conventional column of the same size. The construction of the invention eliminates difficulties encountered in prior columns due to non-uniformity in spacing of the heat exchange tubes on the plates.

The apparatus is of particular advantage when employed in absorption columns for oxides of nitrogen in the making of nitric acid. In such process the efficiency of cooling of the liquid on the plates by the cooling coils has a large effect upon the commercial success of the process.

When the column in which the plates of the invention are used is of large diameter, on the order of four meters or more, the plates must be supported by large strong framework in the column. Such framework is advantageously located beneath the baffles 5, 7, and 9. The above-described bracing members 2a, 2b, and 2c indicate one manner in which the plates may be thus additionally supported. Such manner of additional support of the plates leaves the tops thereof unencumbered and does not interfere with a circulation of the liquid throughout the zones thereof or between successive zones.

In cases in which contact between the gas and the liquid gives rise to appreciable frothing of the liquid, the partitions, such as those shown at 6 and 8, dividing the plate into successive zones may be totally or partially interrupted, as above the froths, to permit the free passage of the froth.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without department from the spirit and scope of the invention as will now be apparent to those skilled in the art.

What is claimed is:

1. In apparatus having a horizontal plate multi-perforated over its main extent and adapted to retain a substantial depth of liquid thereon as the liquid travels generally across the plate, means forming a liquid retaining rim about the plate, the improved plate which comprises means for introducing liquid to the plate at a first location in a zone of the plate, means for discharging liquid from the said zone of the plate at a second location in said zone, the first and second locations being substantially spaced from each other along the direction of general flow of the liquid across the plate, an upstanding baffle on the plate extending generally transversely of such direction of general travel and between the first and second locations, the baffle spanning a substantial portion of the width of said zone but having its ends spaced substantial distances from the edges of the plate, a heat exchange tube coiled around the baffle so as to lie generally within the liquid on said zone of the plate, the turns of the tube being disposed so as to be generally distributed over said zone of the plate, the portions of the coil both upstream and downstream of the baffle lying generally parallel to each other and to the broad extent of the baffle, liquid channeling means lying generally along the direction from the feeding means to the discharge means, the channeling means comprising a trough having first and second parts disposed generally normal to the baffle, opening means extending through said plate and overlying the length of said first and second trough parts, said first trough part extending from the liquid feeding means to the baffle and having a depth which decreases from the liquid feeding means to the baffle, and said second trough part extending from the baffle to the liquid discharging means and having a depth which increases from the baffle to the liquid discharging means, said trough causing the liquid delivered to the inlet end of the trough by the feeding means to spread out and flow laterally on the upstream side of the baffle generally parallel thereto and causing the liquid, after it has flowed around the ends of the baffle and inwardly on the downstream side of the baffle, to be recombined in the exit end of the trough before flowing into the discharge means.

2. An apparatus as defined in claim 1, wherein each trough part has a width which is a small part of the width of the plate, said trough parts being disposed below the plate, and the open upper end of each trough part directly communicating with the upper surface of the plate.

3. An apparatus as defined in claim 2, wherein the upper ends of the trough parts lie generally at the level of the upper surface of the plate.

4. An apparatus as defined in claim 1, wherein the plate is divided into a plurality of isolated zones by at least one partition member extending across the plate from each edge to the other and generally parallel to the first recited baffle, each such zone being provided with a baffle, a heat exchange tube coiled around its respective baffle, a third trough part aligned with said first and second trough parts and extending from the baffle in one zone to the baffle in the adjacent zone and having a depth which increases from the baffle in said one zone to a point in alignment with said partition and then decreases to the baffle in said adjacent zone whereby said third trough part furnishes the only means of flow of liquid between adjacent zones on the plate.

5. In a plate column adapted to effect contact between a gas and a liquid, said column having an upstanding enclosure with a plurality of vertically spaced horizontal plates therewithin spanning the enclosure, said plates being multi-perforated over their main extents and a rim about the plate to retain a layer of liquid thereon as the liquid travels generally across the plates, the improved plate which comprises means for introducing liquid to the plate at a first location in a zone of the plate, means for discharging liquid from the said zone of the plate at a second location in said zone, the first and second locations being substantially spaced from each other along the direction of general flow of the liquid across the plate, an upstanding baffle on the plate extending generally transversely of such direction of general travel and between the first and second locations, the baffle spanning a substantial portion of the width of said zone but having its ends spaced substantial distances from the edges of the plate, a heat exchange tube coiled around the baffle so as to lie generally within the liquid on said zone of the plate, the turns of the tube being disposed so as to be generally distributed over said zone of the plate, the portions of the coil both upstream and downstream of the baffle lying generally parallel to each other and to the broad extent of the baffle, liquid channeling means lying generally along the direction from the feeding means to the discharge means, the channeling means comprising a trough having first and second parts disposed generally normal to the baffle, opening means extending through said plate and overlying the length of said first and second trough parts, said first trough part extending from the liquid feeding means to the baffle and having a depth which decreases from the liquid feeding means to the baffle, and said second trough part extending from the baffle to the liquid discharge means and having a depth which increases from the baffle to the liquid discharging means, said channeling means causing the liquid delivered by the feeding means to the inlet end of the trough to spread out and flow laterally on the upstream side of the baffle generally parallel thereto and causing the liquid, after it has flowed around the ends of the baffle and inwardly on the downstream side of the baffle, to be recombined in the exit end of the trough before flowing into the discharge means.

6. An apparatus as defined in claim 5, wherein each of the trough parts has a width which is a small part of the width of the plate, said trough parts being all of substantially the same width, said trough parts being disposed below the plate, the upper end of each of the trough part directly communicating with the upper surface of the plate.

7. An apparatus as defined in claim 6, wherein the upper end of each of the trough parts lies generally at the level of the upper surface of the plate.

8. A plate column as defined in claim 5, wherein the plate is divided into a plurality of isolated zones by at least one partition member extending across the plate from each edge to the other and generally parallel to the first recited baffle, each such zone being provided with a baffle, a heat exchange tube coiled around its respective baffle, a third trough part aligned with said first and second trough parts and extending from the baffle in one zone to the baffle in the adjacent zone and having a depth which increases from the baffle in said one zone to a point in alignment with said partition and then decreases to the baffle in said adjacent zone whereby said third trough part furnishes the only means of flow of liquid between adjacent zones on the plate.

9. A plate column as defined in claim 5, wherein the means for discharging liquid from the plate includes a tank straddling the last trough part in the plate, the tank having at least one collector compartment therein, the collector compartment having a partition over which liquid flows into the compartment, and conduit means leading from the lower end of the collector compartment to the feeding means for the next lower plate in the column.

References Cited in the file of this patent

UNITED STATES PATENTS

| 1,328,259 | Barbet | Jan. 20, 1920 |
| 2,290,209 | Rosenthal | July 21, 1942 |

FOREIGN PATENTS

| 151,988 | Great Britain | Dec. 1, 1921 |
| 630,884 | Great Britain | Oct. 24, 1949 |
| 737,315 | France | Oct. 3, 1932 |
| 803,212 | Great Britain | Oct. 22, 1958 |